March 5, 1963  J. KRALY  3,079,818
TUBELESS TIRE REPAIR TOOL
Filed Oct. 23, 1961  2 Sheets-Sheet 1
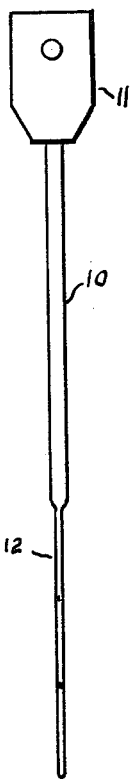
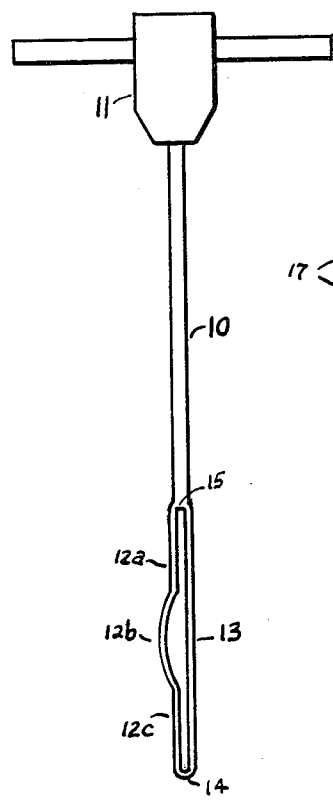
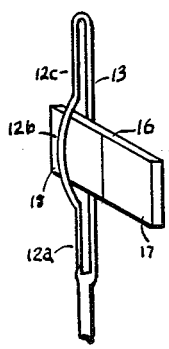
INVENTOR.
JOHN KRALY
BY *Nicholas A. Camasto*
HIS ATTORNEY March 5, 1963   J. KRALY   3,079,818
TUBELESS TIRE REPAIR TOOL
Filed Oct. 23, 1961   2 Sheets-Sheet 2

INVENTOR.
JOHN KRALY
BY Nicholas A. Camasto
HIS ATTORNEY ated Mar. 5, 1963

3,079,818
TUBELESS TIRE REPAIR TOOL
John Kraly, 3629 S. 59th Ave., Cicero, Ill.
Filed Oct. 23, 1961, Ser. No. 146,818
4 Claims. (Cl. 81—15.7)

This invention relates in general to tubeless tire repair tools and in particular to such tools adapted for repairing small injuries in tire casings without necessitating removal of the tire from the wheel.

The rapid acceptance of tubeless tires for automotive vehicles and the like has brought forth a marked need for improved means of quickly and effectively repairing minor injuries thereto, such as may be caused by nails, glass, and other foreign objects.

In general there are two methods employed for repairing such injuries, one of which requires removal of the tire from the wheel and insertion of a tapered repair plug into the injury opening from inside the tire casing, and the other of which involves introducing pliable patch material into the injury opening from outside the tire casing with the use of special tools. There have been many such tools known in the art.

One of the prime deficiencies of such prior art tools is their relatively large size. While such tools are suitable for large injuries, their use for small injuries is generally attended with further damage to the tire cords.

The tool of the invention may be used to repair injuries in all types of tire casings with greater facility than prior art tools. Yet the tool of the invention is light, small and, in part, flexible. In fact this tool is capable of easily repairing, without further damage to the tire casing or cords, injuries resulting from very tiny objects, such as brads.

One of the features of the tool of the invention is the provision of a lubricant carrying area just behind the probe portion of the tool. This greatly facilitates entry of the tool and patch material into the injury opening since lubricant is distributed on the interior surfaces of the injury opening. The lubricant also assists in forming a tight air and moisture proof seal between the walls of the injury opening and the patch material. Accordingly, it is a general object of this invention to provide a tubeless tire repair tool for the repair of small injuries in tire casings which does not result in further damage to tire cords.

A further object of this invention is to provide a tubeless tire repair tool which is relatively simple to use.

Still another object of this invention is to provide a tubeless tire repair tool having a lubricant carrying area for facilitating entry of the tool and patching material into the injury opening.

A still further object of this invention is to provide a tubeless tire repair tool which includes resilient members to insure that the injury opening path in the casing is followed during entry of the tool.

Other objects and advantages of this invention will be apparent upon reading the following specification in conjunction with the drawings in which:

FIGS. 1 and 2 are, respectively, side and front views of the tool of the invention;

FIG. 3 shows a preferred form of patching material for use with the tool of the invention;

FIG. 4 shows how the patching material is inserted in the tool;

FIG. 6 shows the tool and patch material partially through the injury opening;

Figure 5:
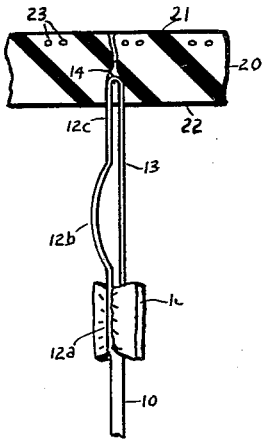
FIG. 5 is a view of the tool entering an injury opening in the tire casing.

Referring now to FIGS. 1 and 2, the tool comprises a shank portion 10 with a handle 11 affixed to one end of said shank portion and a pair of resilient leg members 12 and 13 affixed to the opposite end of the shank portion. The leg members are of generally U shaped configuration with leg 13 being substantially straight and leg 12 consisting of two straight portions 12a and 12c and an outwardly bowed portion 12b. The ends of legs 12 and 13 terminate in a smooth, small radius injury probe 14 which facilitates entry of the tool into the tire casing injury opening.

The leg members are preferably constructed of small diameter spring steel and are formed by bending such a piece of steel back upon itself to define the substantially straight leg member 13 and the small radius probe 14 and by further bending one section of the piece of spring steel to substantially conform to the portions 12a, 12b, and 12c. The free ends of legs 12 and 13 are then firmly affixed to shank portion 10 at 15 by any suitable means such as silver soldering. As shown in the drawings, leg members 12 and 13 have a substantially smaller diameter than shank portion 10. Shank portion 10 is preferably constructed of a relatively rigid material. Handle 11 may be of the removable type or of the type that is firmly affixed to shank portion 10.

The main considerations in the construction of the tool of the invention are that the leg members be as small in diameter as possible consistent with the strength requirement for entering small injury openings in tire casings and that they be flexible to assure that the tool tends to follow the course of the injury opening rather than punch a new opening as prior art tools of rigid construction are prone to do if not skillfully handled. In an actual tool constructed in accordance with the teachings of the invention, the shank portion is approximately .09 inch in diameter whereas the leg portions are approximately .04 inch in diameter.

A feature of this tool lies in the construction of leg 12. Leg 12 includes an outwardly bowed portion 12b for facilitating the insertion of pliable patch material between legs 12 and 13. Portion 12a cooperates with the juxtaposed portion of leg 13 in retaining the patch material during the patching operation. Portion 12c cooperates with its juxtaposed portion of leg 13 in carrying therebetween, lubricant or rubber solvent for application to the interior surfaces of the injury opening. Details of the operation of this tool are brought out in FIGS. 4–9. However, before proceeding to these details reference is made to FIG. 3 which shows a preferred type of patch material which is exceptionally well suited for use with this tool.

In FIG. 3 a thin rectangular shaped piece of patching material 16 is provided having appropriate pieces of cloth 17 and 18 or other suitable protective material affixed to the flat surfaces thereof. Patching material 16 preferably comprises a core of cured rubber having a thin layer of uncured rubber covering both large surfaces. The pieces of cloth are utilized in a well known manner to protect the exposed surfaces of the uncured rubber. These pieces of cloth are removed prior to insertion of the patch material 16 into an injury opening. It should be understood that other well known types of patching material may also be used with this tool, but that the above described patching material is preferred.

FIG. 4 illustrates the facility and ease with which the patching material may be inserted between the leg members of the tool. As shown, the pieces of protective cloth or equivalent are retained during this operation to prevent contact of the outer uncured rubber surfaces of patching material 16 with the fingers or other foreign objects.

After insertion of patching material 16 at portion 12b, the material is centered between the leg members and pulled downward between portion 12a and leg 13 where it is firmly held by the resilience of these legs. The pieces of protective cloth 17 and 18 are then removed and the leg members and patching material are dipped in a suitable rubber lubricant or solvent. Probe 14 of the tool is then slightly inserted into the injury opening. This action is preferably accompanied by rotational movement of the tool to cause the lubricant held between portion 12c and the juxtaposed portion of leg 13 to be distributed on the inside surfaces of the injury opening. The use of the lubricant greatly facilitates entry of the tool in the injury opening and the flexibility of the legs 12 and 13 insure that the tool tends to follow the course of the injury opening.

FIG. 6 shows the leg members 12 and 13 of the repair tool completely inside tire casing 20 and carrying therethrough the pliable patching material 16. The cords near the inside surface 21 of tire casing 20 are indicated by reference character 23. These cords are generally arranged in four or more layers with the cords in each layer running crosswise to the cords in adjacent layers. These details of tire construction are well known in the art and hence are not described or shown. By virtue of the small size of the repair tool, the flexibility of the leg members and the application of lubricant deep within the injury opening, cords 23 are moved laterally to allow passage of the repair tool and patching material without damage thereto. In prior art repair tools the cords more often than not were ruptured by the entry of the tool and patch material.

Figure 7:
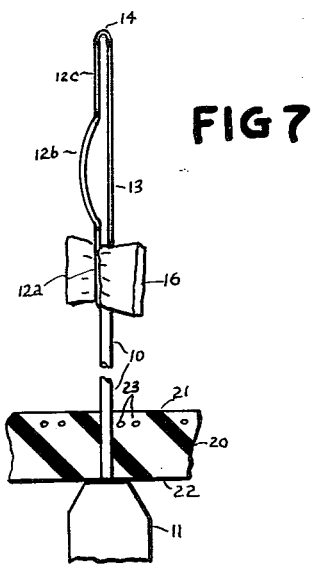
FIG. 7 shows the tool and patching material completely through the injury opening.

FIG. 7 shows the repair tool and patching material completely through the injury opening. Handle 11 may be further utilized, as shown in this figure, to stop the inward travel of the repair tool, although this feature is not essential to the invention.

Figure 8:
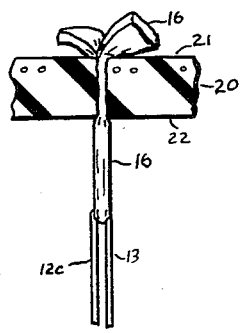
FIG. 8 shows the tool withdrawn from the injury opening.

FIG. 8 shows the pliable patching material 16 being forced back through the injury opening by removal of the repair tool. This figure also shows the constriction of the patching material in the injury opening which results from the natural resiliency of the tire casing. At this point, the portion of patching material 16 extending on the outside of the tire casing may be severed by external means or by rapidly moving the repair tool in a direction transverse to the surface 22.

Figure 9:
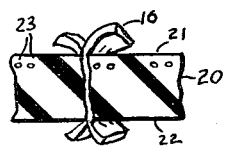
FIG. 9 shows the repaired tire casing.

FIG. 9 shows a completely inserted patch. The excess patch material at the outer edge 22 of casing 20 may be trimmed off if desired, although during normal operation of the tire it will be rapidly worn off. The injury opening is now completely filled with patching material 16 and the combined action of the lubricant and uncured rubber quickly results in an excellent seal which is impervious to air and moisture. It should be noted that more than one piece of patching material 16 may be used with the repair tool for injuries which are larger than those described.

It should also be noted that if one piece of patching material has already been inserted and it is desired to insert another, this may be readily accomplished by following the above procedure and entering the tool between the previously inserted patching material and the tire casing. This is feasible due to the small size and resilient construction of the tool of the invention.

It will be apparent to those skilled in the art that the tool of the invention may be utilized in a slightly different manner. With reference to FIGURE 6, the tool may be stopped at this point of insertion and be pulled backward somewhat to allow the taut portion of patching material 16 within the tire to relax and "ball-up" against inner surface 21. At this point the tool may be removed from the casing causing the inner edge of probe 14 to sever patching material 16 at surface 21. While this method is not preferred, it can of course be used with equal effectiveness, although it obviously requires some skill on the operator's part. This method may also advantageously be applied to those cases where the injury opening is minute and unusual difficulty is experienced in inserting the tool completely.

What has been described is a novel tubeless tire repair tool for quickly and effectively repairing injuries in tubeless tire casings without requiring removal of the tire from the wheel. This tool when used in conjunction with the patch material of FIG. 3 or equivalent is capable of repairing extremely small injury openings without causing further damage to the tire casing or tire cords. Further, the construction of the repair tool provides for a much more simple repair operation and does not require skill on the operator's part.

It will be understood that while the invention has been described in detail with reference to a specific construction of the repair tool, those skilled in the art will readily perceive numerous modifications and departures therefrom within the true spirit and scope of the invention as set forth in the attached claims.

What is claimed is:

1. A tubeless tire repair tool comprising: a generally elongated U-shaped portion formed by a pair of resilient leg members and having a relatively small tip; a rigid shank member connected to the free ends of said leg members and positioned in substantially axial alignment with said leg members; said leg members defining a first area intermediate said ends for receiving patching material therebetween; said first area being formed by a substantially straight part of one of said leg members and a juxtaposed outwardly bowed part in the other of said leg members; said leg members defining a second area adjacent said shank member for retaining said patching material; and said leg members defining a third area intermediate said first area and said tip for carrying lubricant into an injury opening in a tubeless tire casing.

2. A tubeless tire repair tool comprising: a generally elongated U-shaped portion formed by a pair of resilient leg members made from a piece of steel wire and having a relatively small tip; a rigid cylindrical shank member connected to the free ends of said leg members and being positioned in substantially axial alignment with said leg members; said leg members defining a first area intermediate said ends for receiving patching material therebetween; said first area being formed by a substantially straight part of one of said leg members and a juxtaposed outwardly bowed part in the other of said leg members; said leg members defining a second area adjacent said shank member for retaining said patching material; and said leg members defining a third area intermediate said first area and the other of said ends for carrying lubricant into an injury opening in a tubeless tire casing, the cross sectional area of each of leg members being smaller than the cross sectional area of said shank member.

3. A tubeless tire repair tool for inserting pliable patch material into an injury opening in a tubeless tire casing without substantially enlarging said opening or further damaging the cords in said casing comprising; a shank portion; a pair of resilient steel legs attached to said shank portion; said legs being formed from a single piece of small diameter steel extending parallel to said shank portion and bent back upon itself for a first portion of its length, said steel being bowed outward for a second portion of its length and extending parallel to said shank portion for a third portion of its length; said first portion being adapted to guide said tool into an injury opening and carry thereinto lubricant for lubricating the inside walls of said injury opening; said second portion adapted to receive said pliable patch material in a facile manner; said third portion adapted to carry said patch material completely through said injury opening upon insertion therein of said legs and said shank portion, and stop means on said shank portion for limiting the travel thereof into said injury opening.

4. A tubeless tire repair tool for inserting pliable patch material into an injury opening in a tubeless tire casing from outside the casing without substantially enlarging the opening and without further damaging the cords in said casing comprising; a slender rigid shank member; a handle attached to one end of said shank member; a resilient steel rod of smaller cross sectional area than said shank member having a first end fixed to the other end of said shank member and extending parallel to the axis of said shank member for a first part of its length; said rod being bent back upon itself and extending substantially parallel to said first part for a second part of its length; said rod being outwardly bowed from said first part for a third part of its length and extending substantially parallel to said first part for a fourth part of its length and being affixed at its other end to said shank member; said second part, said third part and said fourth part cooperating with the respective juxtaposed portions of said first part to provide respectively, an injury penetrating and lubricant carrying area, a patch receiving area, and a patch retaining area, said second part and the juxtaposed portion of said first part being adapted for rotational movement to distribute said lubricant on the interior walls of said injury opening and the resilience of said leg members insuring that said tool follows the course of said injury and a stop surface on said handle to limit the penetration of said tool in said injury opening.

References Cited in the file of this patent

UNITED STATES PATENTS

| | | |
|---|---|---|
| 574,608 | Jencks | Jan. 5, 1897 |
| 596,165 | Jencks | Dec. 28, 1897 |
| 603,045 | Palmer | Apr. 26, 1898 |
| 2,803,284 | Mullen | Aug. 20, 1957 |
| 2,866,494 | Sanderson | Dec. 30, 1958 |